US012562918B2

(12) United States Patent
Lam et al.

(10) Patent No.: US 12,562,918 B2
(45) Date of Patent: Feb. 24, 2026

(54) POINTER AUTHENTICATION

(71) Applicant: Apple Inc., Cupertino, CA (US)

(72) Inventors: Yin Zin Mark Lam, Milpitas, CA (US); Jeff Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 18/326,910

(22) Filed: May 31, 2023

(65) Prior Publication Data

US 2023/0421354 A1     Dec. 28, 2023

Related U.S. Application Data

(60) Provisional application No. 63/354,611, filed on Jun. 22, 2022.

(51) Int. Cl.
*G06F 21/52* (2013.01)
*H04L 9/32* (2006.01)

(52) U.S. Cl.
CPC ............ *H04L 9/3247* (2013.01); *G06F 21/52* (2013.01)

(58) Field of Classification Search
CPC ................................ G06F 21/52; G06F 21/54
See application file for complete search history.

(56) References Cited

U.S. PATENT DOCUMENTS

| | | | |
|---|---|---|---|
| 7,308,576 B2 | 12/2007 | Glew et al. | |
| 7,720,939 B1 | 5/2010 | Leroy | |
| 8,635,406 B2 | 1/2014 | Greenhalgh | |
| 9,122,873 B2 | 9/2015 | Ghose | |
| 9,514,305 B2 | 12/2016 | Acar et al. | |
| 10,275,365 B1 | 4/2019 | Gonion | |
| 10,409,600 B1 | 9/2019 | Sierra et al. | |
| 10,831,484 B1 * | 11/2020 | Sierra ................. | G06F 9/30054 |
| 11,176,243 B2 | 11/2021 | Shanbhogue et al. | |
| 11,514,159 B2 | 11/2022 | Vandergeest | |
| 2004/0064457 A1 | 4/2004 | Zimmer | |
| 2005/0188214 A1 | 8/2005 | Worley et al. | |
| 2007/0016832 A1 | 1/2007 | Weiss | |
| 2008/0244114 A1 | 10/2008 | Schluessler | |
| 2008/0250217 A1 | 10/2008 | Kershaw et al. | |
| 2012/0233612 A1 | 9/2012 | Beckett | |
| 2014/0082329 A1 | 3/2014 | Ghose | |
| 2014/0096245 A1 | 4/2014 | Fischer | |
| 2014/0122846 A1 | 5/2014 | Vasekin | |

(Continued)

OTHER PUBLICATIONS

International Search Report from PCT/US2023/025420, dated Sep. 27, 2023, pp. 1-11.

(Continued)

*Primary Examiner* — David J Pearson
(74) *Attorney, Agent, or Firm* — Robert C. Kowert; Kowert, Hood, Munyon, Rankin & Goetzel, P.C.

(57) ABSTRACT

In an embodiment, a processor includes hardware circuitry which may be used to detect that a return address has been modified since it was generated. In response to detecting the modification, the processor may be configured to signal an exception or otherwise initiate error handling to prevent execution at the modified return address. In an embodiment, the processor may perform a cryptographic signature operation on the return address to generate a signed return address, and the signature may be verified before the address is used as a return target.

20 Claims, 5 Drawing Sheets

Start – Push Return Address

S=Sign(LR, SP, PC, Key) — 52

Extract M-t bits of S and Concatenate with Bits 0:t of LR to update LR — 54

Write LR to Stack — 56

End – Push Return Address

40

(56) References Cited

U.S. PATENT DOCUMENTS

| | | | |
|---|---|---|---|
| 2015/0040224 A1 | 2/2015 | Litva et al. | |
| 2015/0046690 A1 | 2/2015 | Eickemeyer | |
| 2016/0094552 A1* | 3/2016 | Durham | G06F 21/00 |
| | | | 713/171 |
| 2016/0170769 A1 | 6/2016 | LeMay | |
| 2016/0171211 A1 | 6/2016 | Chen et al. | |
| 2016/0188874 A1 | 6/2016 | Oxford | |
| 2016/0378499 A1 | 12/2016 | Burger | |
| 2017/0024559 A1 | 1/2017 | Hughes | |
| 2018/0183574 A1* | 6/2018 | Ghosh | G06F 21/44 |
| 2018/0307838 A1 | 10/2018 | Sharma et al. | |
| 2019/0087566 A1* | 3/2019 | Hosie | G06F 21/54 |
| 2020/0082070 A1* | 3/2020 | Semeria | G06F 21/125 |
| 2022/0191020 A1* | 6/2022 | Moreira | G06F 21/52 |
| 2023/0088081 A1* | 3/2023 | Lin | G06F 21/52 |
| | | | 726/23 |
| 2023/0259605 A1* | 8/2023 | Larri | G06F 9/3004 |
| | | | 726/18 |
| 2024/0386094 A1* | 11/2024 | Hornung | G06F 21/54 |

OTHER PUBLICATIONS

Law, et al., "Survey and Benchmark of Block Ciphers for Wireless Sensory Networks," ACM Transactions on Sensor Networks (TOSN): ACM New York, NY, USA; vol. 2, Issue 1, Feb. 2006, pp. 65-93.

Borghoff, et al., "PRINCE: a Low-Latency Block Cipher for Pervasive Computing Applications," Asiacrypt'12 Proceedings of the 18th International Conference on the Theory and Application of Cryptology and Information Security, Springer-Verlag Berlin, Heidelberg, 2012, pp. 208-225.

Jean, et al., "Security Analysis of PRINCE," FSE 2013, Mar. 2013, Singapore, Singapore. 2013, pp. 1-12.

Watson, Robert NM, et al., "CHERI: a research platform deconflating hardware virtualization and protection" Workshop paper, Run-time Environmeents, Systems, Layering and Virtualized Environments (RESoLVE 2012), 2012, pp. 1-8.

Kui Xu, et al., "Probabilistic Program Modeling for High-Precision Anomaly Classification," IEEE, 2015, pp. 1-15.

Tyler Bletsch, et al., "Jump-Oriented Programming: A New Class of Code-Reuse Attack," ACM 2011, pages.

International Preliminary Report from PCT/US2023/025420, dated Jan. 2, 2025, pp. 1-7.

* cited by examiner

Sign(LR, SP, PC, Key)                        Auth(LR, SP, PC, Key)

FIG. 3                                        FIG. 4

POINTER AUTHENTICATION

This application claims benefit of priority of U.S. Provisional Application Ser. No. 63/354,611, entitled "Pointer Authentication", filed Jun. 22, 2022, which is hereby incorporated in reference herein in its entirety.

BACKGROUND

Technical Field

Embodiments described herein are related to Return-Oriented Programming (ROP) attacks and mechanisms to prevent such attacks.

Description of the Related Art

ROP attacks are often used by nefarious programmers (e.g., "hackers") in an attempt to compromise the security of a system and thus gain control of the system. Generally, the ROP attacks include modifying return addresses on the stack (ROP), causing execution to return to a different program location than the original return address would indicate. By finding various instructions, or short instructions sequences, followed by returns or jumps in the code on a machine (e.g., operating system code), the ROP attacker can build a list of "instructions." Once the list of instructions forms a Turing Machine, the list can be used by a compiler to compile code to perform the tasks desired by the nefarious programmer.

BRIEF DESCRIPTION OF THE DRAWINGS

The following detailed description makes reference to the accompanying drawings, which are now briefly described.

FIG. 3 is an example of instructions that sign a return/jump address.

FIG. 4 is an example of instructions that authenticate a signed return/jump address.

Figure 1:
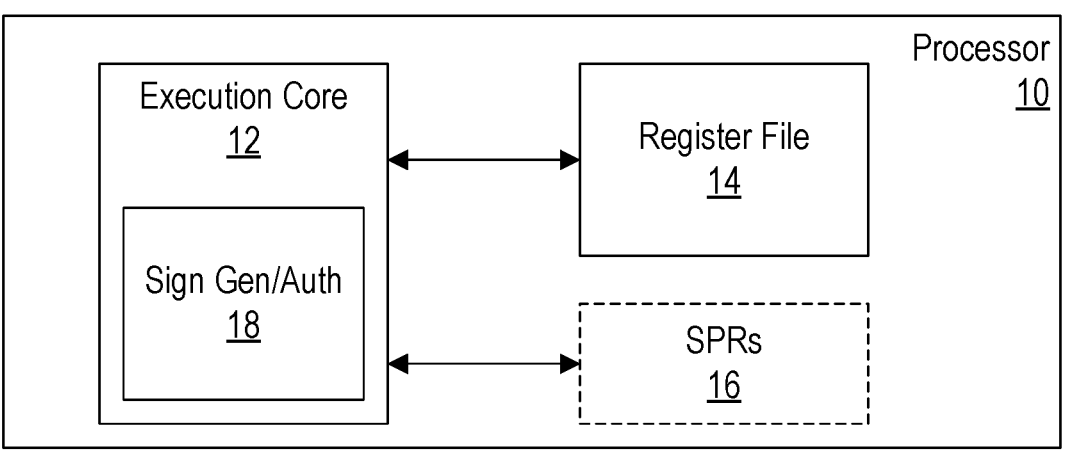
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Normal software control flow often entails multiple pairs of call and return operations. Each call operation pushes a return address on to a stack. The corresponding return operation pops the return address off of the stack, and jumps to the location indicated by the return address. The nefarious programmer, or attacker, can try to hijack the call/return control flow to direct the return to a target piece of code that is not intended by the original software program, but is desired by the attacker. One mechanism employed by such attacks is the ROP attack in which the return address is overwritten on the stack and/or in a register (e.g., a link register) that can be used by the return instruction as a source for the return address (e.g., the stack may be popped into the link register).

A pointer authentication feature (PAC) is a method for protecting control flow integrity (CFI) in software. In the area of ROP prevention, PAC is used to sign the return address that is pushed on the stack. In the paired return operation, the signed return address is popped from the stack and authenticated before it is used to direct control flow. As a result, even if the attacker has the ability to over-write the return address on the stack, they will need to over-write it with a properly signed value. Otherwise, at the return operation, authentication of the popped return address will fail, and the attack will be terminated.

A scheme for signing the return address is to use a secret key value (e.g., in a hidden hardware register) in combination with the value of the stack pointer and the address of the callee (e.g., the target address of the call in the call/return pair, such as the start of a function that will end with a return instruction) to form a diversified key for the cryptographic signing of the return address. The secret key may also be referred to as a cryptographic key. The cryptographic key may be unique to a given system, which may help prevent "break once, run anywhere" types of attacks. That is, even if an attacker were to succeed somehow in attacking one instance of the system, ROP-style attacks could not be used on other instances of the system because the key is different and therefore the signature, even for the same call/return pair, would be different. The stack pointer is a measure of stack height at the time of the call and return operation, and is also an indication of where the return address is stored. The address of the callee identifies the location in memory at which the callee is stored, and thus identifies the callee in the signature. The return address identifies the calling code, since it is associated with the call (e.g., it may point to the next sequential instruction following the call instruction). In this manner, the signature has inputs for both the caller and the callee, linking them together. Substituting a different return address through monitoring of the stack contents at the same height for different call/return pairs may thus not be possible.

In an embodiment, a processor may be configured to perform a signature operation (e.g., by executing a signature instruction). The signature instruction may have a source operand (e.g., store in a register of the processor), and may generate a signature on the source operand. In an embodiment, the signature may be based on a cryptographic key, a stack pointer address (which may be stored in another register of the processor), and the address at which the signature instruction is stored (also referred to as the program counter address, or PC). In an embodiment, the signature instruction may specify an offset (e.g., a displacement or immediate filed of the signature instruction, or even another source operand of the instruction such as another register). The offset may be added to the PC of the signature instruction to produce the address used in the signature generation. The signed value may be stored to a storage location specified by the signature instruction (e.g., the destination operand). A corresponding authenticate operation may be defined as well, which may authenticate a source operand (e.g., the signed value mentioned above) based on the stack pointer and the PC of the authenticate instruction (e.g., plus an offset as mentioned above). For example, the offset may be used to generate same address that was used in the signature instruction. The offsets for the signature instruction and/or the authentication instruction may be coded to zero in some cases, or to any positive or negative value that may be represented with the number of displacement/immediate bits specified by the instruction.

In the case of preventing ROP attacks, for example, the signature instruction may use the return address as the source operand, and the PC plus offset may be the initial instruction of the subroutine that is terminated by the return instruction. Alternatively, the PC plus offset may be the PC of the return instruction, or any other instruction in the subroutine, for example. In the ensuing description, the example of a call and return from a subroutine will be used. However, more generally, the signature instruction and the authenticate instruction may be defined as above.

Turning now to FIG. 1, a block diagram of one embodiment of a processor 10 is shown. In the embodiment of FIG. 1, the processor 10 may include an execution core 12 coupled to a register file 14 and optionally one or more special purpose registers 16.

The processor 10 may be representative of a general-purpose processor that performs computational operations. For example, the processor 10 may be a central processing unit (CPU) such as a microprocessor, a microcontroller, an application-specific integrated circuit (ASIC), or a field-programmable gate array (FPGA). The processor 10 may be a standalone component, or may be integrated onto an integrated circuit with other components (e.g., other processors, or other components in a system on a chip (SOC)). The processor 10 may be a component in a multichip module (MCM) with other components.

As illustrated in FIG. 1, the processor 10 may include the execution core 12. The execution core 12 may be configured to execute instructions defined in an instruction set architecture implemented by the processor 10. The execution core 12 may have any microarchitectural features and implementation features, as desired. For example, the execution core 12 may include superscalar or scalar implementations. The execution core 12 may include in-order or out-of-order implementations, and speculative or non-speculative implementations. The execution core 12 may include any combination of the above features. The implementations may include microcode, in some embodiments. The execution core 12 may include a variety of execution units, each execution unit configured to execute operations of various types (e.g., integer, floating point, vector, multimedia, load/store, etc.). The execution core 12 may include different numbers pipeline stages and various other performance-enhancing features such as branch prediction. The execution core 12 may include one or more of instruction decode units, schedulers or reservations stations, reorder buffers, memory management units, I/O interfaces, etc.

The register file 14 may include a set of registers that may be used to store operands for various instructions. The register file 12 may include registers of various data types, based on the type of operand the execution core 12 is configured to store in the registers (e.g., integer, floating point, multimedia, vector, etc.). The register file 14 may include architected registers (i.e., those registers that are specified in the instruction set architecture implemented by the processor 10). Alternatively or in addition, the register file 14 may include physical registers (e.g., if register renaming is implemented in the execution core 12).

The special purpose registers 16 may be registers provided in addition to the general-purpose registers. While general purpose registers may be an operand for any instruction of a given data type, special purpose registers are generally operands for particular instructions or subsets of instructions. For example, in some embodiments, a program counter register may be a special purpose register storing the fetch address of an instruction. A link register may be a register that stores a return address, and may be accessible to branch instructions. While the special purpose registers 16 are shown separate from the register file 14, they may be integrated into the register file 14 in other embodiments. In some embodiments, certain general-purpose registers may be reserved by compiler convention or other software convention to store specific values (e.g., a stack pointer, a frame pointer, etc.).

The processor 10 may be configured to perform signature and authenticate operations on return addresses, to detect whether or not the addresses have been modified between the time they were created/stored and the time they are to be used as a target. The addresses may be signed when written to memory, in some embodiments. For example, return addresses may be written to the stack in memory. In other embodiments, the return address may be signed in a register to which it is stored when the subroutine call instruction (more briefly, "call instruction") is executed. For example, a link register may be provided to which the return address is stored. When the address is later retrieved to be used as a return target address, the processor 10 may be configured to perform an authenticate operation on the addresses. Error handling may be initiated if the authenticate operations fails, instead of using the address as a fetch address. Performing a signature operation on a value may be more succinctly referred to herein as "signing" the value. Similarly, performing an authenticate operation on a value may be more succinctly referred to herein as "authenticating." The signature generation/authentication circuit 18 (sign gen/auth circuit 18 in FIG. 1) may implement the signature generation and authentication features, in an embodiment.

Generally performing a signature operation or "signing" an address may refer to applying a cryptographic function to the address using at least one cryptographic key and using additional data. The result of the cryptographic function is a signature. By applying the cryptographic function again at a later point and comparing the resulting value to the signature, an authenticate operation may be performed on the address (or the address may be "authenticated"). That is, if the address and/or signature have not been modified, the result of the cryptographic function should equal the signature. The cryptographic key may be specific to the thread that includes the generation of the address and the use of the address as a target, and thus the likelihood of an undetected modification by a third party without the key may be exceedingly remote. The cryptographic key may be generated, at least in part, based on a "secret" that is specific to the instance of the processor 10 and is not accessible except in hardware. The cryptographic key itself may also not be accessible to software, and thus the key may remain secret and difficult to discover by a third party.

In an embodiment, the additional data used in the signature and authentication of the return address may include an address at which the return address is stored. For example, a virtual address of the location may be used (e.g., the virtual stack pointer, for storage of the address on the stack,). Other embodiments may use the physical address. Additionally, the additional data may include the address of the callee (e.g., the first instruction of the function being called). That is, the address may be the target address of the call instruction, referred to herein as the program counter address of the callee, or the PC. As mentioned above, the signature instruction may generally specify a source operand to be signed, and the signature may be generated based on the cryptographic key, the stack pointer, and the PC of the sign instruction (plus an offset specified by the signature instruction).

The cryptographic function applied to the return address may be an encryption of the address using the key(s). The encrypted result as a whole may be the signature, or a portion of the result may be the signature (e.g., the signature may be shortened via truncation or shifting). Any encryption algorithm may be used, including a variety of examples given below.

An instruction may be an executable entity defined in an instruction set architecture implemented by the processor 10. There are a variety of instruction set architectures in existence (e.g., the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 10. Some instructions may be microcoded, in some embodiments. Accordingly, the term "instruction operation" may be used herein to refer to an operation that an execution unit in the processor 10/execution core 12 is configured to execute as a single entity. Instructions may have a one-to-one correspondence with instruction operations, and in some cases an instruction operation may be an instruction (possibly modified in form internal to the processor 10/execution core 12). Instructions may also have a one to more than one (one to many) correspondence with instruction operations. An instruction operation may be more briefly referred to herein as an "op."

In an embodiment, the processor 10 comprises one or more registers and an execution core coupled to the one or more registers. The execution core may be configured to perform a signature operation on a first value to generate a signed value and to store the signed value to a storage location for subsequent use. In an embodiment, the execution core is configured to perform the signature operation based on a cryptographic key, the value of a stack pointer stored in one of the one or more registers, and an address at which an instruction corresponding to the signature operation is stored. In an embodiment, the execution core is configured to perform an authenticate operation on the signed value prior to using the first value. In an embodiment, the signature operation is based on the address and an offset specified by the instruction.

An embodiment of the processor 10 may comprise one or more registers; and an execution core coupled to the one or more registers, wherein: the execution core is configured to perform a signature operation on a source operand of an instruction to generate a signed value and to store the signed value a storage location specified by the instruction; and the execution core is configured to perform the signature operation based on a cryptographic key, the value of a stack pointer stored in one of the one or more registers, and an address of the instruction. In an embodiment, prior to returning to using the signed value from the storage location, the execution core is configured to perform an authenticate operation on the signed value. In an embodiment, the execution core is configured to execute another instruction defined to authenticate the signature. In an embodiment, the storage location is a memory location such as a stack location indicated by a value of the stack pointer. In another embodiment, the storage location is one of the one or more registers. In an embodiment a signature generated from the signature operation is reduced in size and replaces a subset of bits of the source operand in the signed value. In an embodiment, the execution core is configured to execute the instruction, and wherein the instruction is defined to generate the signed value. In an example, the instruction may be used for a call to a subroutine that is terminated by a return instruction, and the source operand is a return address corresponding to the return instruction. In one example, the instruction may be an initial instruction in the subroutine.

Figure 2:
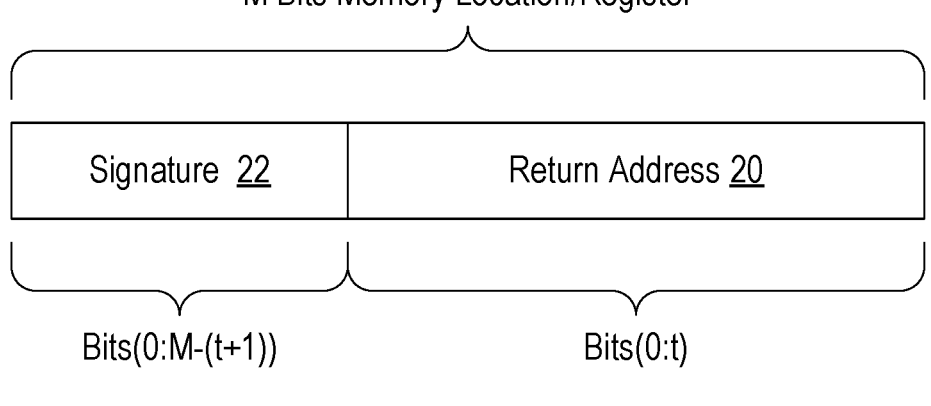
FIG. 2 is a block diagram of one embodiment of a register/memory location for a return/jump address.

Turning now to FIG. 2, a block diagram illustrating one embodiment of an M bit memory location or register is shown. M may be an integer greater than zero. More particularly, M may be the architectural size of a virtual address in the processor 10. For example, some instruction set architectures specify 64 bit addresses currently. However, the actual implemented virtual address size may be smaller, (e.g., 40 to 48 bits of address). Thus, some of the address bits are effectively unused in such implementations. In an embodiment, the most significant implemented virtual address bit may be replicated in the remaining virtual address bits, up to the architected maximum. In an embodiment, one or more most significant bits of the architected maximum may be viewed as inactive, and the most significant address bit may be replicated up to the most significant active address bit. For example, the most significant bit may be viewed as active or inactive, in an embodiment. The unused bits may be used to store the signature for the address, in an embodiment. Other embodiments may store the signature in another memory location.

In the embodiment of FIG. 2, t+1 bits of virtual address are implemented (field 20), where t is less than M and is also an integer. The remaining bits of the register/memory location store the signature (field 22). The signature as generated from the encryption algorithm may be larger than the signature field 22 (e.g., larger than M–(t+1) bits). Accordingly, the signature actually stored for the address may be a portion of the signature. That is, the signature may be reduced in size from the signature generated by the signature operation, and may replace a subset of bits of the return address. For example, the signature may be truncated. Alternatively, the signature may be right-shifted. Any mechanism for shortening the signature field may be used.

The processor 10 may implement the signature generation and authentication in hardware. For example, signature generation/authentication circuit 18 is shown in FIG. 1 and may include circuitry to sign and authenticate return addresses (or more generally, to sign and authenticate a source operand). There may be instructions defined for the instruction set architecture which cause the signature to be generated or authentication to be performed. FIGS. 3 and 4 illustrate embodiments of instructions for signature generation and authentication, respectively.

FIG. 3 illustrates an embodiment of a signature generation instruction. In this embodiment, the Signature (Sign) instruction takes as input operands a virtual return address stored in a link register (LR), a virtual stack pointer address stored in a stack pointer register (SP), a virtual instruction address (PC), and a key. The PC may be the address at which the signature instruction is stored. The key may be stored in a hardware-accessible register or other storage device for access by the hardware only. The key may be one key, or multiple keys, depending on the encryption algorithm that is implemented by the processor 10. The coding illustrated in FIG. 3 may be an example for return address authentication. More generally, the LR may be any source operand (e.g., any register). The sign instruction may also specify an offset, in an embodiment, such as a displacement or an immediate field. The displacement/immediate field may be added to the PC operand.

The Sign instruction may apply an encryption algorithm to the data producing a signature which may be written to a target register (e.g., back to the link register). The data may be combined prior to the encryption (e.g., the return address, stack pointer, and PC may be logically combined according to any desired logic function, such as exclusive-OR-based functions) and the resulting data may be encrypted with the key. The data may be concatenated and encrypted using one or more passes of a block encryption (block cipher) mechanism. Any type of encryption may be used, including any type of block encryption such as advanced encryption standard (AES), data encryption standard (DES), international data encryption algorithm (IDEA), PRINCE, etc. A factor in determining the encryption algorithm to be used is latency of the algorithm. Accordingly, a single pass of encryption may be selected that is strong enough to protect the encrypted data to a desired level of security. A signature resulting from the encryption may then be shortened to match the field 22. The result in the target register may be of the form shown in FIG. 2.

As mentioned above, a variety of logic operations may be used to combine the data included in the signature generation. The least significant bits (LSBs) of the addresses may contain the most entropy, which may provide for secure encryption. The most significant bit (MSB) of the address differentiates privileged and unprivileged memory, in an embodiment. As mentioned above, bits 0 . . . t may contain an address and bits t+1 to M may be the replicated bit. Additionally in an embodiment, the PC and LR registers may be required to be aligned to 32-bit boundaries (e.g., the instructions may be 32 bit fixed-length instructions in the implemented ISA). The stack pointer may be aligned to a 128-bit boundary (e.g., pairs of 64 bits values may generally be pushed and popped on the stack).

Accordingly, the bits to be encrypted may include PC bits t to 2, LR bits t . . . 2, and SP bits t . . . 4. In an embodiment, the following mechanism may be used: Form a first value P using the least significant 21 bits from of LR, PC, and SP to form a 63-bit value, and append bit t of PC at bit position 63 to form a 64-bit value to be encrypted; Form a diversifier value D using the middle-significant 21 bits of LR, PC, and SP, and appending bit t of LR at bit position 63 to form a 64-bit value to use as the diversifier; form a third value R by interleaving the remaining implemented bits of LR, PC, and SP (e.g., up to bit t) and 0. Replicate the resulting value across 64-bits, leaving bit 63 zero; and encrypt the values as follows using cryptography which takes 2 64-bit values to generate a single encrypted 64-bit value C=E(X,Y), where X is R XOR P, and Y is R XOR D. The resulting encrypted value C may then be shorted to produce the signature field 22. For example, M-t bits may be extracted from C and used as the signature.

FIG. 4 illustrates and of the authentication instruction. The Auth instruction may take as input operands the LR, SP, and PC values and a key. The Auth instruction may apply the same encryption algorithm as the Sign instruction to the return address field 20, producing a signature. The resulting signature may be compared to the original signature in the signature field 22 (shortened in the same fashion as the original signature was shortened). If the signatures do not match, the authentication fails and return to the address is prevented. If the signatures match, the authentication passes and return to the address is permitted. The return may be prevented, e.g., by taking an exception. As mentioned above, more generally the authentication instruction may take any source operand in place of the LR register. The authentication instruction may specify an offset (e.g., displacement or immediate field) to be added to the PC.

In an embodiment, the Sign and Auth instructions may be implemented as two or more instruction operations in the processor 10. For example, in an embodiment, the callee address may be specified as the PC of the call instruction plus an offset or immediate field. One instruction operation may add the PC and offset/immediate to produce the PC to be used by the Sign and Auth instructions. The other instruction operation may take the PC generated by the first instruction operation, the LR and SP values, and may perform the signature/authentication operation using the specified key.

Figure 5:
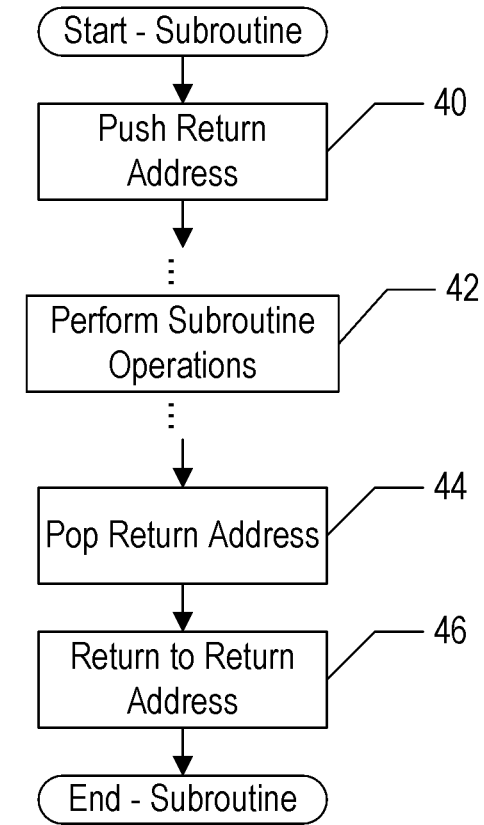
FIG. 5 is a flowchart illustrating an exemplary subroutine.

Turning next to FIG. 5, a flowchart is shown illustrating an exemplary subroutine that may be executed by the processor 10 in a system. While the blocks are shown in a particular order for ease of understanding, other orders may be used. Instructions executed by the processor 10 and/or hardware in the processor 10 may implement the operation shown in FIG. 5.

The processor 10 may push the return address for the subroutine onto the stack (block 40). The push may occur in the calling code, before jumping to the address of the subroutine, or may occur within the subroutine. Additional details regarding some embodiments of pushing the return address are described below with regard to FIG. 6. The subroutine may include instructions that perform the operation(s) for which the subroutine is designed (indicated generally at reference numeral 42). The subroutine may pop the return address from the stack (block 44) and return to the return address (block 46). That is, the return address may be used as a fetch address to fetch the next instructions to execute in the processor 10. Additional details regarding some embodiments of popping the return address are described below with regard to FIG. 7.

Figure 6:
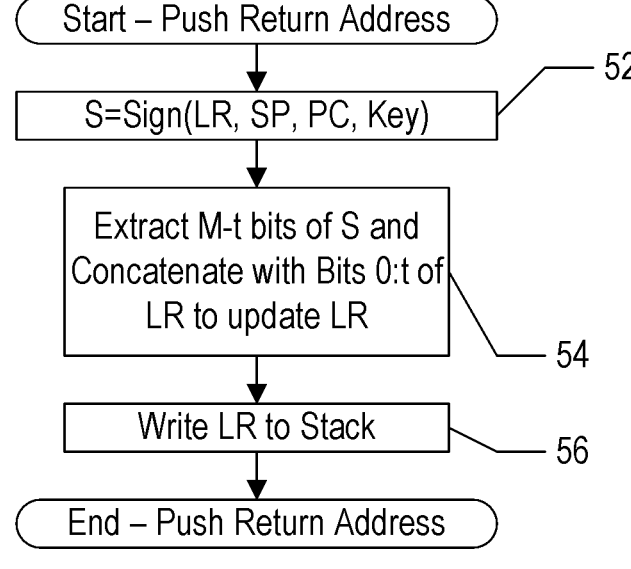
FIG. 6 is a flowchart illustrating the pushing of a return address for one embodiment.

Turning now to FIG. 6, a flowchart is shown illustrating one embodiment of pushing a return address (e.g., block 40 in FIG. 5). While the blocks are shown in a particular order for ease of understanding, other orders may be used. Instructions executed by the processor 10 and/or hardware in the processor 10 may implement the operation shown in FIG. 6.

The signature based on the VA, the return address (LR), the address of the callee (PC) and the key may be generated by applying the selected encryption algorithm to the data (block 52). The generated signature may be combined with the return address to form the signed return address (e.g., as shown in FIG. 2) (block 54). For example, M-t bits may be extracted from S and concatenated with bits 0:t of the return address (LR) and may be written to LR as the signed return address. The signed return address from LR may be pushed onto a memory location indicated by the value of the stack pointer (block 56). As mentioned above, any encryption algorithm may be used. For example, multiple passes of a block encryption algorithm may be used. In an embodiment, the PRINCE algorithm may be used.

Figure 7:
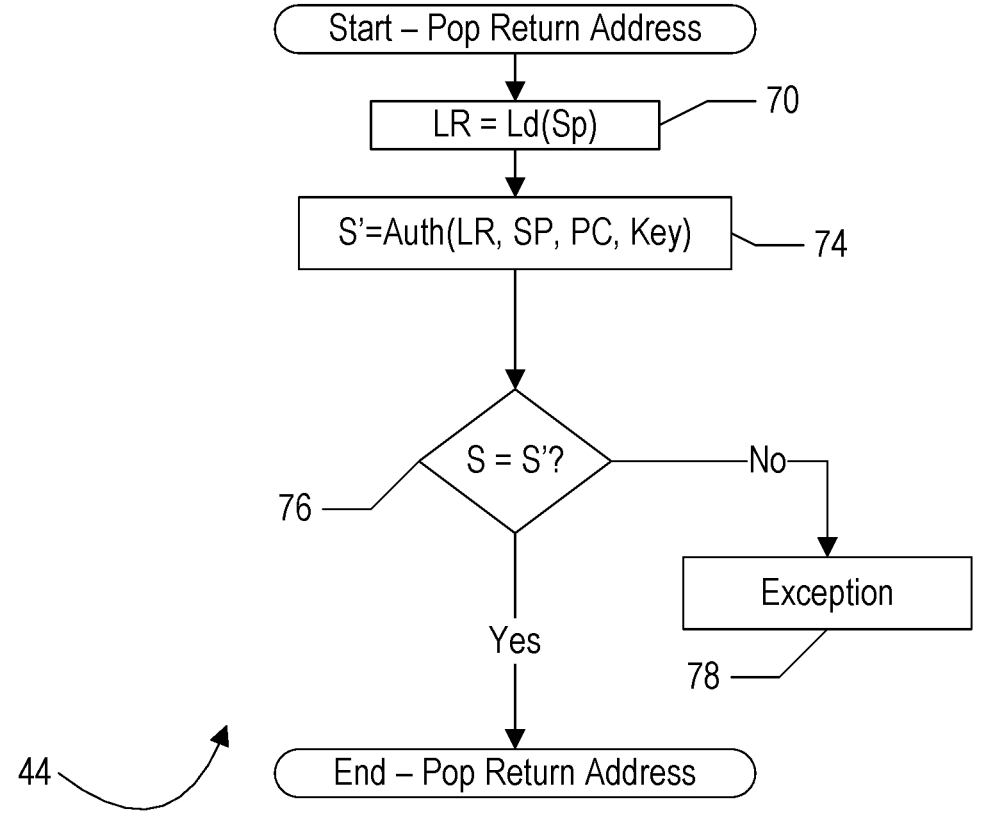
FIG. 7 is a flowchart illustrating the popping of a return address for one embodiment.

Turning now to FIG. 7, a flowchart is shown illustrating one embodiment of popping a return address (e.g., block 44 in FIG. 5). While the blocks are shown in a particular order for ease of understanding, other orders may be used. Instructions executed by the processor 10 and/or hardware in the processor 10 may implement the operation shown in FIG. 7.

The signed return address may be loaded from the memory location indicated by the value of the stack pointer into a target register (e.g., LR) (block 70). The signed return address may be authenticated by applying the same operation that was applied when the return address was initially signed, producing a signature S'. S' may be compared the signature field 22 (block 74). If the signature remains valid (i.e., the signature S' generated in the authentication matches the original signature S in the address) (decision block 76, "yes" leg), the return address may be used and thus operation may proceed to block 46 in FIG. 5. Otherwise (decision block 76, "no" leg), the processor 10 may signal an exception to prevent the return address from being used (block 78).

In an embodiment, a method comprises generating a return address for a call to a subroutine that is terminated by a return instruction in a processor; performing a signature operation on the return address to generate a signed return address, wherein the signature operation is based on a cryptographic key, a value of a stack pointer, and an address of an initial instruction in the subroutine; detecting an attempt to use the signed return address by the return instruction; authenticating the signed address responsive to detecting the attempt; and preventing the return to a failure in authenticating the signed address.

As mentioned previously, one embodiment of the encryption algorithm may be the PRINCE algorithm. The PRINCE algorithm employs a 128-bit key, which is expressed as two 64-bit keys K0 and K1. The 128-bit key is expanded to 192 bits by generating a K0'. K0' is the exclusive OR of K0 right rotated by one and K0 right shifted by 63. PRINCE is based on the so-called FX construction [7, 30]: the first two subkeys K0 and K0' are whitening keys, while the key K1 is the 64-bit key for a 12-round block cipher referred to as $PRINCE_{core}$. The 12 rounds may be unrolled so that the latency of the cipher is 1 clock cycle, in some embodiments. Additional details of the PRINCE algorithm are provided in the paper "PRINCE—A Low-latency Block Cipher for Pervasive Computing Applications" by Borghoff et al., published in Xiaoyun Wang and Kazue Sako, editors. Advances in Cryptology—ASIACRYPT 2012—18th International Conference on the Theory and Application of Cryptology and Information Security, Beijing, China, Dec. 2-6, 2012, pages 208-225.

Computer System

Figure 8:
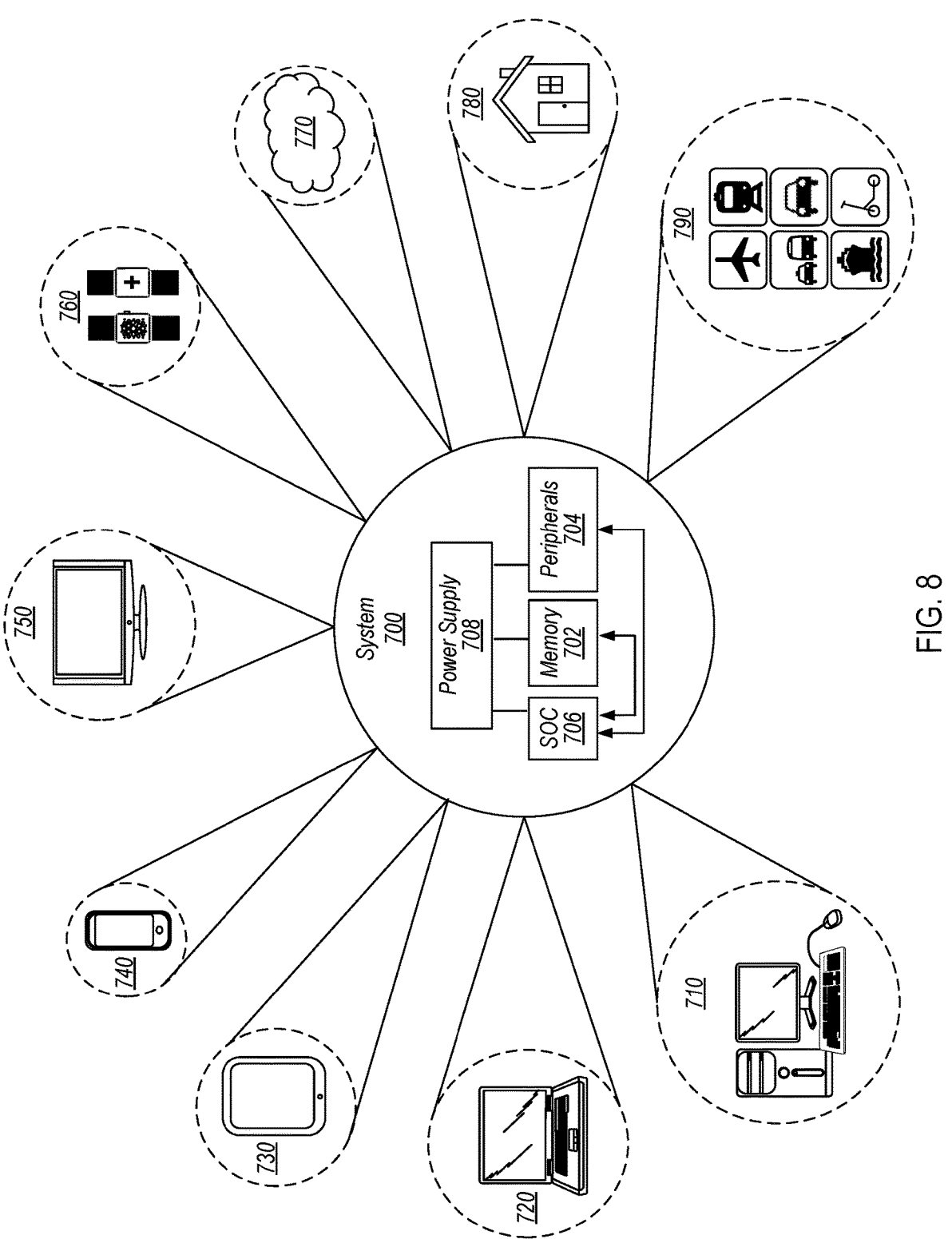
FIG. 8 is a block diagram of one embodiment of a system.

Turning next to FIG. 8, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC may be included (and more than one memory 702 may be included as well). The SOC 706 may include one or more instances of the processor 10 illustrated in FIG. 1, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home 780 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 700 to various modes of transportation 790. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

Computer Readable Storage Medium

Figure 9:
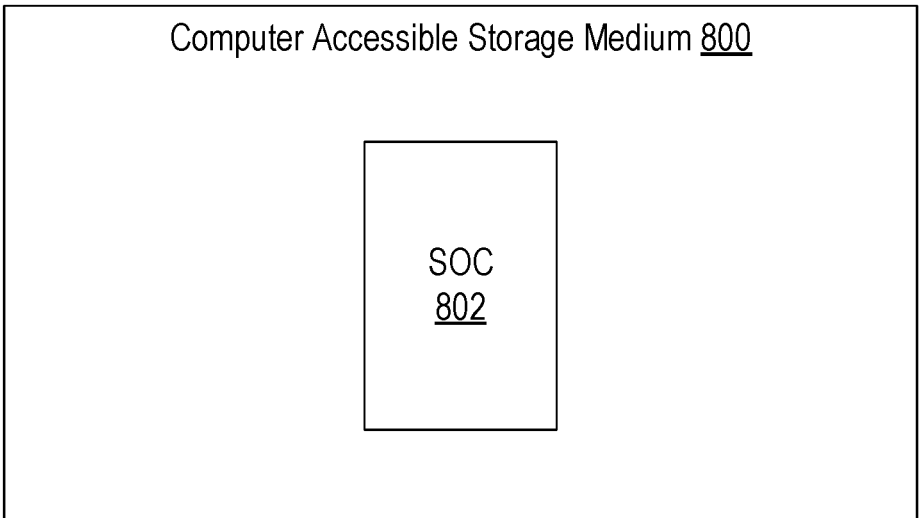
FIG. 9 is a block diagram of one embodiment of a computer accessible storage medium.

Turning now to FIG. 9, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 9 may store a database 804 representative of the SOC 706. Generally, the database 804 may be a database which can be read by a program and used, directly or indirectly, to fabricate the hardware comprising the SOC 706. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 706. The netlist may then be placed and routed to produce a data set describing geometric shapes to be applied to masks. The masks may then be used in various semiconductor fabrication steps to produce a semiconductor circuit or circuits corresponding to the SOC 706. Alternatively, the database 804 on the computer accessible storage medium 800 may be the netlist (with or without the synthesis library) or the data set, as desired.

While the computer accessible storage medium 800 stores a representation of the SOC 706, other embodiments may carry a representation of any portion of the SOC 706, as desired, including the processor 10 as shown in FIG. 1 or any subset thereof.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor comprising:
   one or more registers; and
   an execution core coupled to the one or more registers, wherein:
      the execution core is configured to execute an instruction to perform a signature operation on a first value to generate a signed value and to store the signed value to a storage location for subsequent use; and
      to generate the signed value, the execution core is further configured to perform the signature operation based on a cryptographic key, the value of a stack pointer stored in one of the one or more registers, and an address at which the instruction is stored.

2. The processor as recited in claim 1 wherein the signature operation is based on the address and an offset specified by the instruction.

3. The processor as recited in claim 1 wherein the storage location is one of the one or more registers.

4. The processor as recited in claim 1 wherein the storage location is indicated by the value of the stack pointer.

5. The processor as recited in claim 1 wherein to store the signed value to the storage location the execution core is configured to store the signed value using a subset of bits of the storage location.

6. The processor as recited in claim 1 wherein the signed value is a partial portion of an encryption generated from the signature operation on the first value.

7. The processor as recited in claim 1 wherein the signature operation is based on a block cipher algorithm.

8. The processor as recited in claim 7 wherein the block cipher algorithm includes one of: advanced encryption standard (AES), data encryption standard (DES), international data encryption algorithm (IDEA), or PRINCE.

9. The processor as recited in claim 1 wherein to perform the signature operation the execution core is further configured to:

perform a combination or concatenation operation on the first value, the value of the stack pointer, and the address of the instruction to generate a combined value; and perform the signature operation on the combined value to generate the signed value based on the cryptographic key.

10. The processor as recited in claim 9 wherein the combination operation is based on an exclusive-OR function.

11. The processor as recited in claim 1 wherein prior to performing the signature operation the execution core is configured to:

perform a combination operation on the address of the instruction and an offset to generate a combined value; and perform the signature operation on the combined value to generate the signed value based on the cryptographic key.

12. The processor as recited in claim 1 wherein the execution core is configured to perform an authenticate operation using the signed value for the subsequent use.

13. The processor as recited in claim 12 wherein to perform the authenticate operation the execution core is configured to:

obtain a value from the storage location for the subsequent use;

perform a second signature operation on the obtained value to generate a second signed value;

authenticate the obtained value based on the signed value and the second signed value.

14. The processor as recited in claim 13 wherein to authenticate the obtained value the execution core is configured to determine whether the signed value matches the second signed value based on comparison of the signed value and the second signed value.

15. The processor as recited in claim 13 wherein the obtained value is a return address for a call to a subroutine that is terminated by one or more return instructions.

16. The processor as recited in claim 15 wherein the second signature operation is based on the cryptographic key, the value of the stack pointer, and an address of an initial instruction in the subroutine.

17. The processor as recited in claim 13 wherein the second signature operation is based on the cryptographic key, the value of the stack pointer, and an address at which an instruction corresponding to the authentication operation is stored.

18. A method comprising:

generating a return address for a call to a subroutine that is terminated by a return instruction;

performing a signature operation on the return address to generate a signed return address, wherein the signature operation is based on a cryptographic key, a value of a stack pointer, and an address of an initial instruction in the subroutine;

detecting an attempt to use the signed return address by the return instruction;

authenticating the return instruction based on the signed address responsive to detecting the attempt; and preventing the return due to a failure in authenticating the return instruction.

19. The method as recited in claim 18 wherein authenticating the signed address responsive to detecting the attempt comprises:

obtaining an address for the return instruction;

performing a second signature operation on the obtained address to generate a second signed return address, wherein the second signature operation is based on the cryptographic key, the value of a stack pointer, and an address of the return instruction; and authenticating the return instruction based on comparison of the signed address and the second signed address.

20. The method as recited in claim 18 further comprising:

prior to performing the signature operation, performing a combination operation on the return address, the value of the stack pointer, and the address of the initial instruction to generate a combined value; and performing the signature operation on the combined value to generate the signed value based on the cryptographic key.

* * * * *